United States Patent [19]

Hanafusa et al.

[11] Patent Number: 5,134,474
[45] Date of Patent: Jul. 28, 1992

[54] METHOD OF COMPENSATING SCATTERED CHARACTERISTICS OF OUTPUTS OF AN INFRARED DETECTOR OF MULTIPLE-ELEMENT TYPE

[75] Inventors: Tsutomu Hanafusa, Sagamihara; Kikuo Shiraishi, Kawasaki, both of Japan

[73] Assignee: Fujitsu Limited

[21] Appl. No.: 735,323

[22] Filed: Jul. 24, 1991

[30] Foreign Application Priority Data

Jul. 24, 1990 [JP] Japan .................. 2-195509

[51] Int. Cl.⁵ .................................. H04N 7/18
[52] U.S. Cl. ...................... 358/113; 250/332; 250/334; 358/227
[58] Field of Search ............ 358/113, 227; 250/332, 250/334

[56] References Cited

U.S. PATENT DOCUMENTS

| | | |
|---|---|---|
| 4,734,583 | 3/1988 | Wang ........................ 250/332 |
| 4,821,337 | 4/1989 | Alm ............................ 358/113 |
| 4,835,606 | 5/1989 | Peck .......................... 250/334 |

*Primary Examiner*—Howard W. Britton
*Attorney, Agent, or Firm*—Staas & Halsey

[57] ABSTRACT

In the method of the present invention for compensating scattered characteristics of infrared detector elements, a scene to be monitored is input through a focusing lens onto the infrared detector elements and the scene on the infrared detector elements is defocused or placed out of focus by adjusting the focusing lens. In addition, in the method a first signal level output from each detector element is then measured, the scene is focused, and a second signal level output from each detector element is compensated according to thus obtained measured signal having an average level. In the case where the scene is optically scanned on the linearly arranged detector elements, the first signal level may be averaged for a predetermined number of scans to obtain an average level of each detector element, and may be further averaged on a plurality of the scan directions slanted or rotated with respect to the scene. The scan direction is rotated by rotating a prism placed in the light path around the light path, to predetermined angular positions between 0 to 90 degrees so that the light input to the detector element is more properly averaged, to provide an improved average level. Temperature data of the central portion of the scene may be deleted omitted from the averaging operation because the central portion includes noises caused from a narcissus effect. In addition, temperature data is excluded because in the case where the scan directions are slanted by the prism rotation the central portion always detects the same object, the averaging of the scene is deteriorated.

15 Claims, 3 Drawing Sheets

METHOD OF COMPENSATING SCATTERED CHARACTERISTICS OF OUTPUTS OF AN INFRARED DETECTOR OF MULTIPLE-ELEMENT TYPE

BACKGROUND OF THE INVENTION

1. Field of the Invention

The present invention relates to a method for compensating scattered signal output characteristics of a multiple-element type infrared detector employed in a thermal imaging system.

2. Description of the Related Art

InSb (indium-antimony), $HG_{1-x}Cd_xTe$ (mercury-cadmium-tellurium), etc. have been employed as infrared detector elements inafrared detector apparatus. The scattered characteristics of the elements are individually adjusted with an electric circuit connected to each element or numerically adjusted with a program installed in the apparatus.

In the above-described prior art thermal imaging system, a reference plate having a temperature almost equal to the temperature of the temperature image detecting apparatus is temporarily placed so as to obstruct the light path to the the reference plate is typically placed in front of the infrared camera, in order to input an equal light to all of the detector elements. Then, amounts of compensating of DC (direct current) offsets of the individual detector elements are determined from output signal levels of the respective detector elements while the equal light is thus input thereto. The amounts of compensation of DC offsets are then stored in a memory device. Next, in the practical operation of the apparatus, the reference plate is removed so that a scene to be monitored is input to the camera. Then, the thermal image is constituted or constructed with the detector output signals whose DC offsets are compensated by being added with the thus determined amounts of compensation read out of the memory.

The prior art thermal imaging system however, has the following problems. First, temperature of the reference plate is not always equal or close to the thermal range of the practical scene to be monitored. Therefore, the compensation for the scene, which generally was a thermal range different from the reference plate temperature, cannot always be accurately achieved by the DC offset compensation using the reference plate having the certain fixed temperature. Moreover, a mechanism required to place/remove the reference plate into or out of the light path becomes large as well as requires troublesome and time-consuming work.

SUMMARY OF THE INVENTION

It is a general object of the invention, therefore, to provide a simple and accurate method for compensating scattered characteristics of infrared temperature detecting elements without requiring a particular mechanism.

In the method of the present invention for compensating scattered characteristics of infrared detector elements, a scene to be monitored is input through a focusing lens onto the infrared detector elements. The scene on the infrared detector elements is defocused or placed out of focus by adjusting the focusing lens so that the input scene is averaged equally onto all of the infrared detector elements; and signal levels output from individual detector elements are measured as first signal levels of detector elements. Next, the focus is adjusted so as to focus the scene on the detector elements; and second signal levels output from the individual infrared detector elements are compensated according to the thus obtained first average for each detector element.

In the case where the scene is optionally scanned on the linearly arranged detector elements, the first signal level may be averaged for a predetermined scan number to obtain a first average level of each detector element.

The optical averaging may be further improved by averaging the first signal level or the first averaged level of each element for a plurality of the scan directions slanted or rotated with respect to the scene. The scan direction is rotated by rotating a prism placed in the light path on the way to or projected on a scanning mirror, around the light path, to predetermined angular positions between 0 to 90 degrees so that the light input to the detector element is more properly averaged, to provide an improved average level.

Temperature data of a central portion of the scene may be deleted from the averaging operation because the central portion includes noises caused from narcissus effect, and because in the case where the scan directions are slanted by a prism rotation the central portion always detects a same object, which deteriorates the averaging of the scene. Thus, the temperature data is less accurate than the method of the present invention.

The above-mentioned features and advantages of the present invention, together with other objects and advantages mentioned below, which will because apparent, and will be more fully described hereinafter, with reference being made to the accompanying drawings which form a part thereof, wherein like numerals refer to like parts or elements throughout.

DESCRIPTION OF THE PREFERRED EMBODIMENTS

Figure 1:
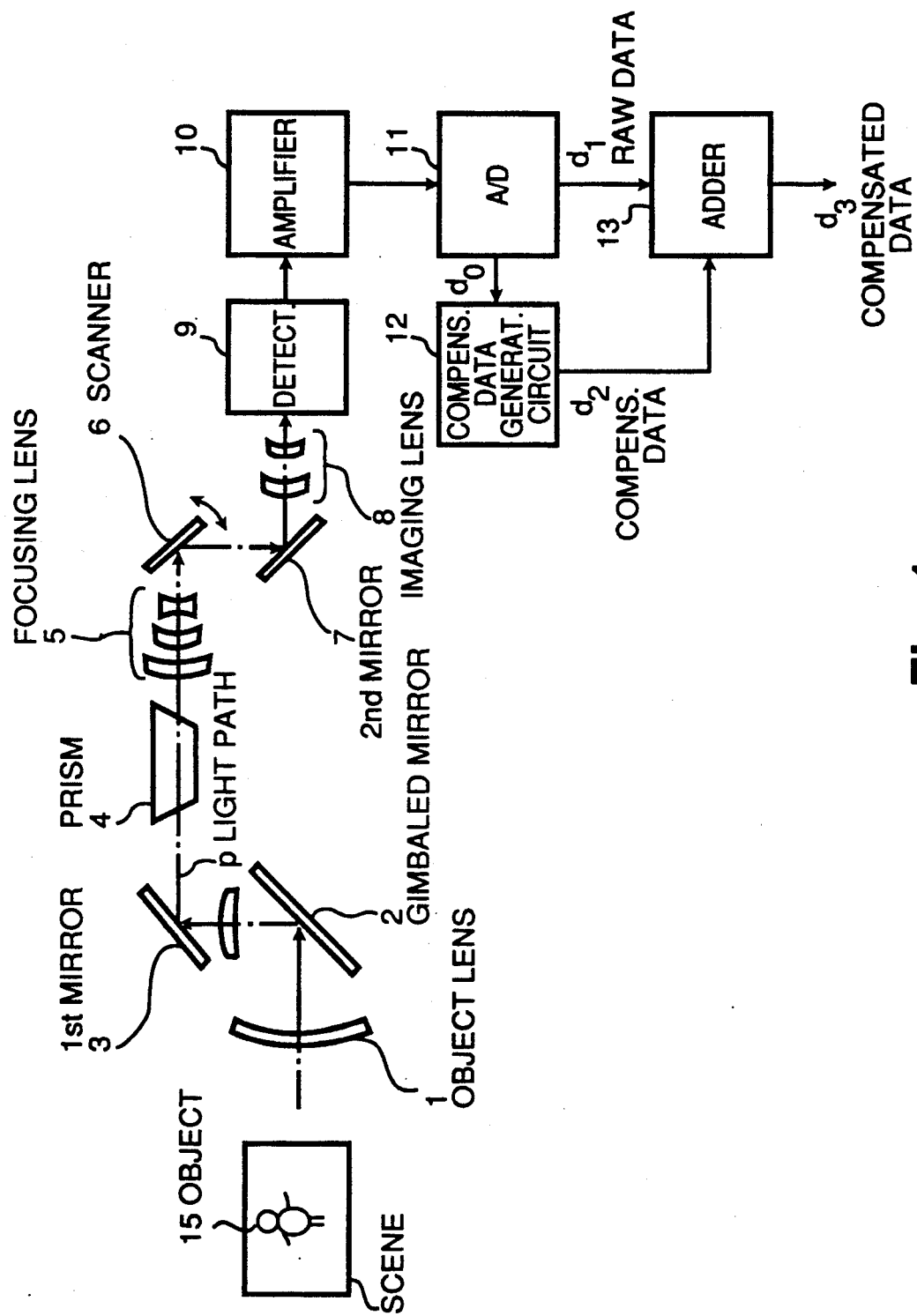
FIG. 1 schematically illustrates a configuration of a preferred embodiment of the present invention.
Figure 2:
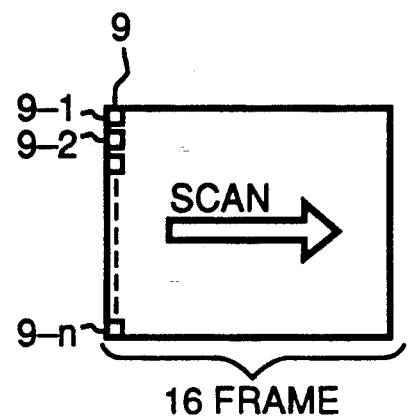
FIG. 2 schematically illustrates linearly arranged infrared detector elements employed in the FIG. 1 embodiment.

A first preferred embodiment of the present invention applied to an infrared (referred to hereinafter as IR) camera is hereinafter described in detail with reference to FIG. 1, where linearly arranged infrared detector elements (referred to hereinafter as line detectors) are employed. A light from a scene, whose temperature image is now to be monitored by the camera is input, via or through an object lines 1, reflected off a gimbaled mirror 2, and passes through a first stationary mirror 3. The light then passes through a prism 4, focusing lens 5, a scanning mirror 6, reflected off a second stationary mirror 7 and passes through imaging lens 8, into the infrared line detectors 9 of a (charge-coupled device) type. Gimbaled mirror 2 is for deflecting the camera view to a scene deviated or positioned up, down, right or left, from the direction front of the camera without moving the camera body. First and second stationary mirrors 3 and 7 are merely for an appropriate layout of these optical components. Prism 4 is a trapezoid prism (functioning as a triangular prism) rotatable around the light path from first mirror 3 to focusing lens 5 so as to cancel or remove the rotated angle of the scene caused from gimbaled mirror 2 when looking at an object deviated from the direct front of the camera. Thus, prism 4 permits the scene to be naturally seen without a slant or distortion. The function of prism 4 is explained later in detail. Focusing lens 5 is formed of a plurality of lenses, which together with imaging lens 8 focuses the scene onto detectors 9. Scanning mirror 6 swings, i.e. scans, the scene inputs from focusing lens 5, in a horizontal direction of vertically lined detectors 9 as shown in FIG. 2. Light of the scene input to each element 9-1, 9-2, --- 9-n of line detectors 9 shown in FIG. 2 in converted to an electrical signal (referred to hereinafter a signal). The signal is amplified in amplifier 10 and then converted to a digital signal by an anlog-to-digital converter 11 (referred to hereinafter as A/D converter). The above-described configuration and process are of those employed in conventional infrared image detecting apparatus.

According to the method of the present invention, for monitoring a distant scene the focusing lens 5 is adjusted so as to focus a near-most distance while the camera is looking at the distant scene, or in monitoring a near scene focusing lens 5 is adjusted so as to focus a far-most distance while the camera is looking at the near scene. In other words, the scene to be monitored is defocused or placed out of focus as much as possible. Then, the thus amply defocused scene provides almost equal light, which is to represent an average of the practical scene to be monitored to each 9-1, --- 9-n of the line detectors 9 in FIG. 2. That is, the scene is optically averaged. Then, the signals are serially output from IR CCD detectors of the thus defocused state, and are amplified by amplifier 10 and A/D-converted by A/D converter 11. The A/D-converted signals $d_0$ are input to compensation signal generator 12, where the signals $d_0$ are further averaged by an electronic circuit for each detector element for a single or a predetermined number of scans so as to provide a detector element level. In addition, the signal levels are averaged for each scan of each detector element so as to provide an average level data $d_2$ as compensation data. Then, the average level data $d_2$ is stored in a RAM (random access memory) provided in compensation data generator 12 but not shown in FIG. 1. Next, focusing lens 5 is adjusted to focus the scene while keeping on or continuing to view the same scene. Then, signals are output from detectors 9, amplified by amplifier 10 and A/D-converted by A/D converter 11 so as to output raw data $d_1$. Raw data $d_1$ is reduced by an adder 13 by the average level data $d_2$ read from the RAM. In other words, the DC offset is adjusted for each detector element by the respective average level data $d_2$. Though it is described that this compensation operation is carried out by compensation data generator 12 and adder 13, these operations may be functioned or also performed with a CPU (central processor unit) and its software, provided in the infrared detector apparatus. Compensated data $d_3$ output from adder 13 may be used for displaying a temperature image on a display device or further processed for automatically detecting an abnormal temperature rise in the scene, for example.

Figure 3A:
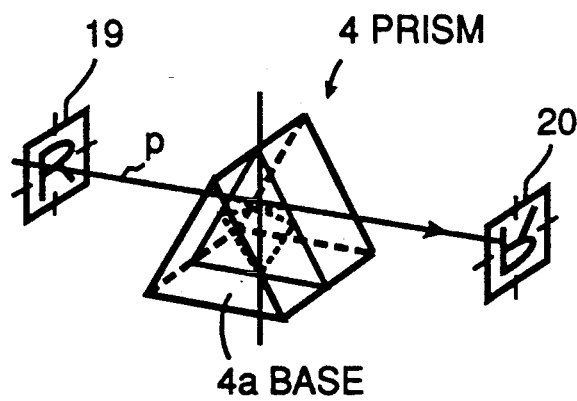
FIGS. 3a, and 3b, schematically explain the function of the prism.
Figure 3B:
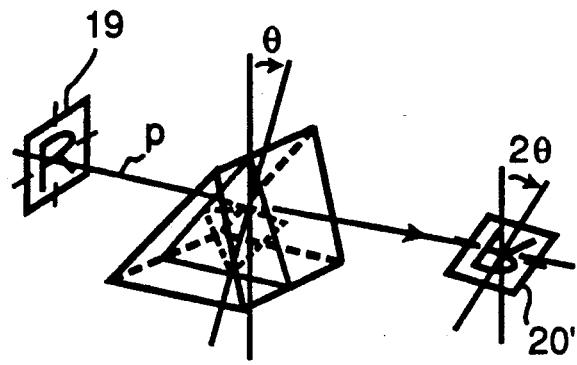
Figure 4:
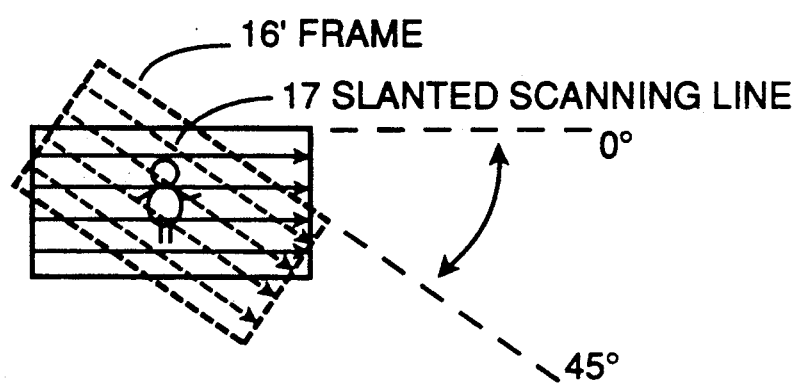
FIG. 4 shows the scan directions of the light when a prism is rotated by 0 and 45 degrees.

A second preferred embodiment of the present invention is hereinafter described. Though in the above explanation it is described that the scene is optically averaged, in some cases the averaging is not perfectly achieved depending on shape, size and location of an object 15 in the scene of FIG. 1. In order to achieve a quality averaging of the scene to be monitored, according to the present invention prism 4 is rotated around its light path so as to slant or rotate the scan direction denoted with the numeral 17 in FIG. 4. In FIG. 4, scan directions 0 and 45 degrees are representatively drawn. The function of prism 4 is hereinafter explained, referring to a triangular prism in FIG. 3a. Prism 4 is a so-called derotation prism having an isoceles triangle cross-sectional view cut rectangularly to the prism axis. A scene input to prism 4 in parallel to its base side 4a of the prism is inverted in a direction vertical to base side 4a but not inverted in horizontal direction parallel to the axis of the prism. This is explained in FIG. 3a, where the input scene 19 is shown with a character R, and its image 20 after passing through the prism is shown with a character R inverted only in the vertical direction. When the prism is rotated around its light path p by $\theta$ degrees, it image 20 shown with an inverted R is rotated by $2_b$ degrees. Therefore, the rotation from 0 to 90 degrees of prism 4 is enough to cover all the needed scan directions, i.e. 0 to 180 degrees, of the scene. In the second preferred embodiment, the rotation of the prism is carried out several times, such as every 10 degrees for a total of 90 degrees i.e., the prism is rotated 9 times. Signals output from individual detector elements obtained at all the rotated positions are averaged for each detector element for the predetermined scan numbers in the same way as the first preferred embodiment so as to provide a second average level $d_2'$ of each detector element. A single scan is theoretically enough for this averaging operation; however, in practice the averaging operation is preferably carried out, for example, for 16 scans for increased accuracy due to for example sensor inadequacies. Thus, the second average level $d_2$ thus obtained in the second preferred embodiment is better, i.e. more uniformly, averaged over the whole scene.

In above-described preferred embodiments the scattered output characteristics of line detector elements can be individually properly compensated even when the thermal range of the scene to be monitored is different from temperature of the temperature image detecting apparatus. The proper compensation of the scattered output characteristics are because no reference plate, which inherently has the temperature of the apparatus, is required and the compensation is based on an average level obtained by optically as well as electrically averaging the real temperatures of the object scene itself. Accordingly, a quality temperature image can be obtained. Moreover, no mechanism for installing/removing the reference plate to/from the apparatus is required. Thus, the apparatus can be small, as well as being simple in construction.

A third preferred embodiment of the present invention is hereinafter described. Though in the second preferred embodiment it is described that the entire scene is optically averaged the central portion of the scene always comes to the central portion of the scanned frame, which causes deterioration or degradation of the quality of the averaging. Moreover, in a practical thermal image sensing apparatus, object lens 1 and focusing lens 5, etc., are placed in front of IR detectors 9. An image of the detectors themselves of as low as typically $-200°$ C. is reflected by these optical components back to the detectors. In other words, the detectors detect the their own image, causing, for example, a 0.8° C. erroneous drop, which is as much as 3 to 5 times lower than the NETD (noise equivalent temperature difference), in the signal at the central portion. This is called a narcissus phenomenon. In order to avoid this problem, in the third preferred embodiment the data of the picture cells at the central portion of the frame is rejected or excluded from the averaging operation in compensation data generator 12. The central portion to be rejected to obtain the improved average level is typically determined as an area where the temperature signal level drops lower than threshold level which is lower than the NETD, for example 0.2° C. lower than the average level (which is referred to as a first average level) determined in the second preferred embodiment. The signals below the thus determined threshold level are excluded from the averaging operation by a threshold circuit provided in compensation data generating circuit 12. Then, compensation data for each detector element is generated in the similar way as that of the second preferred embodiment, but based on the thus determined second average excluding the central portion. Thus, the third preferred embodiment provides more accurate compensation of the scattered characteristics of the detector elements.

Though in the above preferred embodiments the IR detectors are linearly arranged across the scene which is mechanically scanned, it is apparent that the concept of the second preferred embodiment can be applied to an IR temperature image detecting apparatus having two-dimensionally arranged IR detectors without a mechanical scan. In this case, the average level of each detector elements at the defocused state is obtained by averaging the output signal levels of each detector elements for all the angular positions of the prism.

Though in the above preferred embodiments the IR detectors are referred to as of CCD type, it is also apparent that the present invention may be applied to other types of detectors than the CCD type.

Though in the above preferred embodiments the compensation is carried out for adjusting DC offsets of the detector elements, it is also apparent that the present invention may be applied to compensate other particular characteristics than DC offsets, such as the gain of individual elements. When the gain of the individual elements is to be compensated, the averaging operation must be carried out two or more times looking or scanning different scenes having different thermal ranges so that the output levels of all the elements are calculated to determine the amount of the compensation of the particular characteristics i.e., in this example, the gain of individual element.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, the specification has not been detailed to limit the invention and accordingly, all suitable modifications or equivalents falling within the scope of the invention hereby reserved.

What we claim is:

1. A method for compensating scattered characteristics of infrared detector elements, for monitoring light from a scene, comprising the steps of:
   (a) inputting the light to be monitored, through a focusing lens onto the infrared detector elements;
   (b) adjusting the focusing lens to place the light on the infrared detector elements out of focus, so that the light is input substantially equal onto substantially all of the infrared detector elements;
   (c) measuring a first signal level output from each of the infrared detector elements;
   (d) focusing the light onto the infrared detector elements;
   (e) measuring a second signal level output from each of the infrared detector elements; and
   (f) compensating said second signal level using said first signal level.

2. A method for compensating scattered characteristics of infrared detector elements as recited in claim 1, wherein the infrared detector elements comprise a charge-coupled device.

3. A method for compensating scattered characteristics of infrared detector elements as recited in claim 1, wherein the scattered characteristics of each of the infrared detector elements to be compensated is a DC offset.

4. A method as recited in claim 1, wherein:
   said light comprises an area and a central position; and
   said measuring step (e) is performed for the area excluding the central portion of the light.

5. A method as recited in claim 4, wherein
   said infrared detector elements are provided in an apparatus; and
   said method further comprises the step of measuring a temperature at said central portion which is lower than a predetermined threshold level which is lower than said second averaged level by a noise equivalent temperature difference of the apparatus.

6. A method for compensating scattered characteristics of infrared detector elements as recited in claim 1, wherein:
   the infrared detector elements are arranged on a single line;
   the infrared detector elements are arranged on a single line;
   the method further comprises after said measuring step (c), the step of averaging said first signal level measured in step (c) of each of the infrared detector elements for a predetermined number of scans generating a first averaged level; and
   said compensating step (f) comprises the step of compensating said second signal level using said first averaged level.

7. A method for compensating scattered characteristics of infrared detector elements as recited in claim 6, wherein said compensating step (f) comprises the step of reducing said first averaged level from said second signal level, for each of the infrared detector elements.

8. A method as recited in claim 6 wherein:
   said light comprises a central portion having a temperature;
   said infrared detector elements being provided in an apparatus; and
   said method further comprises the step of measuring the temperature at said central portion being lowered than predetermined threshold level which is lower than said first averaged level by a noise equivalent temperature difference of the apparatus.

9. A method for compensating scattered characteristics of infrared detector elements arranged on a single line provided in an infrared thermal imaging apparatus, for monitoring light from a scene having a light path being scanned across the single line, the method comprising the steps of:

(a) inputting the light having the light path through a prism and a focusing lens placed in the light path of said light, onto the infrared detector elements;

(b) defocusing the light on said infrared detector elements;

(c) measuring a first signal level output from each of the infrared detector elements;

(d) averaging said measured first signal level of each of the infrared detector elements for a predetermined number of scans generating a first averaged level;

(e) rotating said prism around said light path by a predetermined angle to rotate a direction of scanning the light scene;

(f) repeating said steps (c) through (e), using a plurality of predetermined angular positions of said prism;

(g) averaging said first averaged level measured using all of said plurality of predetermined angular positions for each of the infrared detector elements generating a second averaged level of each of the infrared detector elements;

(h) fixing said plurality of predetermined angular positions at an angle where the light is properly input to the infrared detector elements;

(i) focusing the light onto the infrared detector elements;

(j) measuring a second signal level output from each of the infrared detector elements; and (k) compensating said second signal level by using said second averaged level.

10. A method as recited in claim 9, wherein said prism is a derotation prism.

11. A method as recited in claim 10, wherein said repeating step (f) further comprises the step of repeating said steps (c) through (e) using a plurality of predetermined angular positions of said prism from 0 to 90 degrees.

12. A method as recited in claim 9, wherein:
said light comprises an area and a central portion; and
said averaging step (d) is performed for the excluding the central portion of the light.

13. A method as recited in claim 12, wherein:
said infrared detector elements are provided in an apparatus; and
said method further comprises the step of measuring a temperature at said central portion which is lower than a predetermined threshold level which is lower than said second averaged level by a noise equivalent temperature difference of the apparatus.

14. A method of compensating scattered characteristics of two-dimensionally arranged infrared detector elements provided in an infrared temperature detecting apparatus, comprising the steps of:

(a) inputting light from a scene having a light path through a prism and a focusing lens placed in the light path of said light, onto the infrared detector elements;

(b) defocusing the light on said infrared detector elements;

(c) measuring first signal levels output from each of the infrared detector elements (d) rotating said prism around said light path by a predetermined angle to rotate an angle of the light;

(e) repeating said steps (c) and (d), using a plurality of predetermined angular positions of said prism;

(f) averaging said first signal levels measured using all of said plurality of predetermined angular positions for each of the infrared detector elements generating an averaged level of each of the infrared detector elements;

(g) fixing said plurality of predetermined angular positions at an angle where the light is properly input to the infrared detector elements;

(h) focusing the light onto the infrared detector elements;

(i) measuring a second signal level output from each of the infrared detector elements; and (j) compensating said second signal level by using said averaged level.

15. A method for compensating scattered characteristics of infrared detector elements having offsets for monitoring light from a scene input through an focusing lens onto the infrared detector elements, the method comprising the steps of:

(a) optically averaging the light producing an optically averaged signal;

(b) electronically averaging said optically averaged signal producing an electronically averaged signal; and (c) adjusting the offsets using said electronically averaged signal.

* * * * *

UNITED STATES PATENT AND TRADEMARK OFFICE
CERTIFICATE OF CORRECTION

PATENT NO. : 5,134,474

DATED : July 28, 1992

INVENTOR(S) : Tsutomu Hanafusa et al.

It is certified that error appears in the above-identified patent and that said Letters Patent is hereby corrected as shown below:

Column 1, line 25, change "the the" to --the detectors. The--.

Column 2, line 55, change "lines 1, " to --lens 1,--;
line 60, change "a (charge-" to --a CCD (charge- --.

Column 4, line 19, change "2b " to --20--.

Column 6, lines 38-39, delete "the infrared detector elements are arranged on a single line;".

Signed and Sealed this

Fifth Day of October, 1993

BRUCE LEHMAN

Attest:

Attesting Officer

Commissioner of Patents and Trademarks